(12) United States Patent
Francalanci et al.

(10) Patent No.: US 8,295,244 B2
(45) Date of Patent: Oct. 23, 2012

(54) METHOD FOR BUILDING NEIGHBORING CELLS LISTS IN CELLULAR RADIOCOMMUNICATIONS NETWORKS

(75) Inventors: Indro Francalanci, Turin (IT); Massimiliano Panico, Turin (IT)

(73) Assignee: Telecom Italia S.p.A., Milan (IT)

( * ) Notice: Subject to any disclaimer, the term of this patent is extended or adjusted under 35 U.S.C. 154(b) by 657 days.

(21) Appl. No.: 12/448,352

(22) PCT Filed: Dec. 22, 2006

(86) PCT No.: PCT/EP2006/012449
§ 371 (c)(1), (2), (4) Date: Aug. 11, 2009

(87) PCT Pub. No.: WO2008/077416
PCT Pub. Date: Jul. 3, 2008

(65) Prior Publication Data
US 2010/0015977 A1    Jan. 21, 2010

(51) Int. Cl.
*H04W 4/00*    (2009.01)
(52) U.S. Cl. ........ 370/331; 370/338; 370/341; 370/351; 370/395.31; 370/395.32; 455/436

(58) Field of Classification Search ............... 370/328, 370/329, 331, 338, 341, 351, 395.31, 395.32; 455/436
See application file for complete search history.

(56) References Cited

U.S. PATENT DOCUMENTS

| | | | |
|---|---|---|---|
| 6,985,731 B1 | 1/2006 | Johnson et al. | |
| 7,885,226 B2 * | 2/2011 | Han | 370/328 |
| 2003/0235163 A1 | 12/2003 | Montz et al. | |
| 2004/0152480 A1 * | 8/2004 | Willars et al. | 455/513 |
| 2004/0203779 A1 | 10/2004 | Gabara | |
| 2006/0092883 A1 * | 5/2006 | Lee et al. | 370/332 |

FOREIGN PATENT DOCUMENTS

| | | |
|---|---|---|
| EP | 0 369 535 B1 | 8/1995 |
| EP | 1 427 234 A1 | 6/2004 |
| GB | 2 389 015 A | 11/2003 |

* cited by examiner

*Primary Examiner* — Christopher Grey
(74) *Attorney, Agent, or Firm* — Finnegan, Henderson, Farabow, Garrett & Dunner, L.L.P.

(57) ABSTRACT

A method for defining lists of neighboring cells of a cellular radiocommunications network, includes: obtaining a description of mobility paths followed by users of mobile communications terminals in a geographic area of interest; and including a first cell in the list of neighboring cells of a second cell in case, based on the mobility paths' description, to ascertain that there is a mobility path joining the first and the second cells.

7 Claims, 6 Drawing Sheets

METHOD FOR BUILDING NEIGHBORING CELLS LISTS IN CELLULAR RADIOCOMMUNICATIONS NETWORKS

CROSS REFERENCE TO RELATED APPLICATION

This application is a national phase application based on PCT/EP2006/012449, filed Dec. 22, 2006.

BACKGROUND OF THE INVENTION

1. Field of the Invention

The present invention relates to the field of telecommunications, particularly radiocommunications, and even more particularly to mobile radiocommunications networks, viz. cellular radiocommunication networks, like mobile telephony networks of the second generation (GSM—General System for Mobile communications—networks) and of the third generation (UMTS—Universal Mobile Telecommunications System—networks). Specifically, the invention concerns a method for building neighboring cells lists to be used by mobile communications terminals to accomplish hand-over from one cell to another.

2. Description of the Related Art

Cellular networks are formed of a plurality of network cells which, altogether, provide radio coverage of a geographic area of interest. It is possible to ideally subdivide said geographic area into a discrete number of elementary area elements or "pixels" (e.g., square area portions of some tens meters of side); each cell is defined as the subset of pixels that are "served" by the radioelectric signal irradiated by a given transmission station (in the GSM, a BTS—Base Transceiver Station—or a "Node B" in the UMTS).

A characterizing feature of cellular networks is that they allow user mobility. The passage of a generic user, having a mobile communications terminal registered to a cellular network, from one cell of the network to another is handled by means of a procedure referred to as "hand-over". If the two cells belong to a same system (i.e., they are both cells of a GSM or UMTS network), an "intra-system hand-over" is said to take place; on the contrary, in case of heterogeneous networks (e.g., implementing both the GSM and the UMTS systems), the passage of the user from the cell of one system (e.g., a GSM cell, or a UMTS cell) to a cell of another system (a UMTS cell or, respectively, a GSM cell) is called "inter-system hand-over".

The hand-over procedure is invoked when the level and/or quality of the radio communication channel currently supporting the communications of a user within a cell worsen below a predetermined minimum level, while the level of the signal reaching the user terminal and coming from a neighboring cell is sufficient to sustain the communication. In such a case, the network causes the communications with that user to migrate from the radio channel used so far and belonging to the cell of origin to a new radio channel, belonging to the neighboring, destination cell.

In order to successfully accomplish the hand-over, the destination cell needs to belong to a list of cells which the user mobile terminal exploits, while connected to the cell of origin and engaged in a call, to conduct a signal measurement campaign. When the mobile terminal connects to a network cell, the network provides to that terminal the list of neighboring cells (the so-called "NeighBoring Relations or NBR set) that the network knows being neighbors to the cell the terminal is connected to. The mobile terminal, while engaged in a call and communicating with the cell it is currently connected to, measures the level of the signals it receives from the other cells in the NBR set, and reports the measurement results to the network, so that the latter is kept constantly informed of when, and towards which destination cell, the hand-over is to be performed. Differently, when in "idle mode", the communication is mainly unidirectional, from the network to the terminal.

The NBR set may include cells of the same system (GSM, UMTS), geometrically adjacent to (i.e., cells having boundaries in common with) the cell the mobile terminal is currently connected to ("intra-system adjacency relationships"), as well as cells of other systems that are spatially close to the cell the mobile terminal is currently connected to ("inter-system adjacency relationships").

The NBR sets for the various network cells are determined in the network planning phase, and are then stored in the network apparatuses, ready to be provided to the terminals of users that connect to the network.

The network planning is usually made with the help of dedicated software tools.

Generally, the NBR sets are defined taking into account the topology of the network under planning, possibly in combination with electromagnetic field propagation aspects.

Methods for defining the NBR sets in the network planning phase are for example described in the published European patent application EP 1 427 234; essentially, the aim of those methods is to define the NBR set for a generic network cell putting in it the cells that, most likely, will be destination cells of hand-over procedures from the considered cell, once the network will be deployed.

SUMMARY OF THE INVENTION

The Applicant has observed that the current methods for defining NBR sets are not satisfactory.

For example, a limit of the methods described in the cited document EP 1 427 234 is that all the pixels of the area of interest are considered equally probable in terms of capacity of generating traffic.

In particular, the Applicant has observed that both in the case the NBR sets are built based on the topology of the network under planning (i.e., a cell is included in the NBR set of another cell if the best server area of the former cell contacts, i.e., is adjacent to, the best server area of the latter cell), and in the case the NBR sets are built based on electromagnetic field propagation aspects (i.e., based an the level of the signals received in a certain pixel other than the best server signal), not all the cells neighborhood relationships thus established will in the practice exhibit a significant probability of generating hand-over requests to the network.

On the other hand, the size of the NBR sets is intrinsically rather limited: a mobile terminal cannot indeed be asked to perform measurement campaigns on too high a number of signals; for this reasons, in the practice NBR sets may include, for example, 32 cells.

Thus, known methods for defining NBR sets may lead to include into the NBR set of a certain cell also cells that, albeit being topologically or electromagnetically neighbor, would never experience a hand-over, neglecting instead some cells that, on the contrary, would in the practice be involved in hand-over procedures.

The Applicant has found that the generation of requests of hand-over depends not only on the topology of the network, nor only on the electromagnetic field propagation aspects, but also, to a great extent, on the fact that in the area of interest specific user motion paths exist. The Applicant has therefore found that handover functionalities may be improved by taking into account, when building the NBR sets, the paths traveled by users in the area of interest, in particular in connection with the coverage areas of the considered network cells.

Such specific user motion paths may in particular be determined by the urban and extra-urban streets and routes plan (streets, routes, highways, and the like), and by railways.

The Applicant has found that once this additional information is taken into account in the definition of NBR sets for the cells of the network under planning, much better results are obtained, in that it is possible to exclude from the NBR lists those neighboring cells that are very unlikely reached in a direct way by users moving in (and connected to) a considered cell, i.e. those neighboring cells for which the handover from the considered cell is very unlikely.

The present invention thus relates to a method for defining lists of neighboring cells of a cellular radiocommunications network, comprising:
  obtaining a description of mobility paths for users of mobile communications terminals in a geographic area of interest; and
  including a first cell in the list of neighboring cells of a second cell in case, based on the mobility paths description, it is ascertained that there is a mobility path joining the first and the second cells.

Preferably, the method further comprises:
  dividing the geographic area of interest into a plurality of elementary area elements; and
  assigning every elementary area to a respective network cell.

Advantageously, obtaining a description of mobility paths for users of mobile communications terminals in the geographic area of interest comprises obtaining at least one vectorial description of said mobility paths.

The at least one vectorial description may comprise, for each mobility path, at least one vector item formed of a pair of geographic points belonging to the mobility path.

Preferably, the step of including a first cell in the list of neighboring cell of a second cell in case, based on said mobility paths description, it is ascertained that there is a mobility path joining the first and the second cells, comprises including the first cell in the list of neighboring cells of the second cell if at least one pixel of the first cell and at least one pixel of the second cell belong to one of the vector items.

The first cell is included in the list of neighboring cells of the second cell if said at least one pixel of the first cell is adjacent to said at least one pixel of the second cell.

The method may further include:
  for each of the user mobility paths, providing a statistical description of users motion speeds along the mobility paths, and
  based on said description of users motion speeds, assessing potential hand-over criticalities.

Preferably, for a user of a mobile communications terminal moving along a mobility path from the second cell to the first cell, assessing potential hand-over criticalities comprises checking if a permanence time of the user in the first cell is lower than a predetermined minimum time.

The present invention also relates to a method for making handover in a cellular radiocommunications network, comprising:
  obtaining a description of mobility paths for users of mobile communications terminals in a geographic area of interest;
  including a first cell in a list of neighboring cells of a second cell in case, based on said mobility paths description, it is ascertained that there is a mobility path joining the first and the second cells;
  making handover when a user of a mobile communications terminal passes from said second cell to said first cell using said list of neighboring cells.

The present invention further relates to a computer program comprising instructions adapted to implement such method.

Moreover, the present invention relates to a data processing system adapted to implement such method when programmed to execute the above computer program.

BRIEF DESCRIPTION OF THE DRAWINGS

The features and advantages of the present invention will become apparent reading the following detailed description of an embodiment thereof, provided merely by way of non-limitative example, description that will be conducted making reference to the annexed drawings, wherein:

FIG. 4 schematically shows a vector description of a mobility path of FIG. 1;

DETAILED DESCRIPTION OF AN EMBODIMENT OF THE INVENTION

Figure 1:
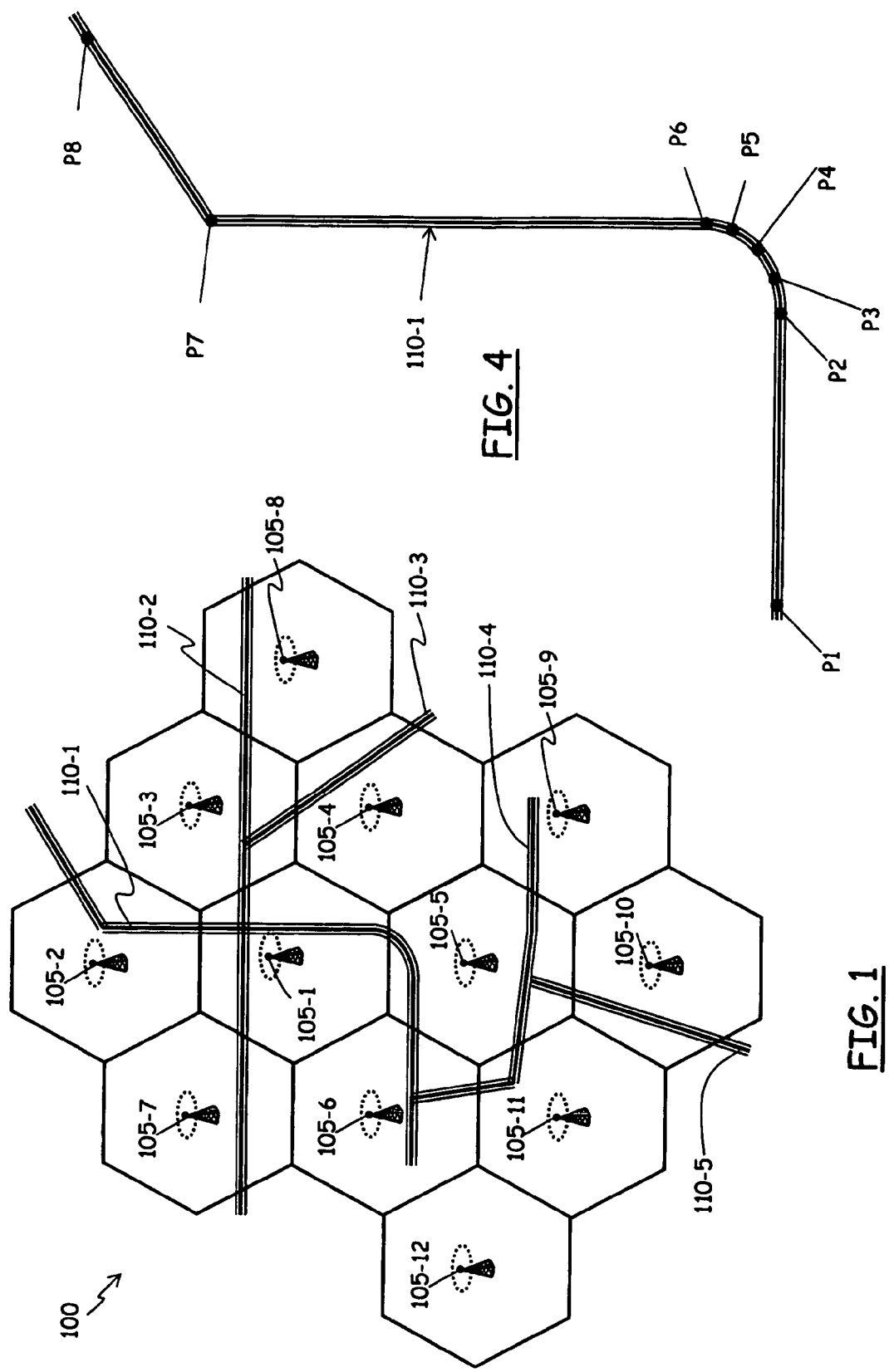
FIG. 1 schematically shows a small portion of a geographic area intended to be covered by a cellular network.

With reference to the drawings, in FIG. 1 a small portion of a geographic area 100 is schematically depicted, intended to be covered by a cellular network under planning, or where the coverage of an already deployed cellular network is to be improved. The cellular network may in particular be a second-generation ("2G") mobile telephony network, e.g. a GSM network, or a third-generation ("3G") cellular network, like a UMTS network, or a heterogeneous network, supporting both 2G and 3G standards. The specific type of cellular network is per-se not limitative to the present invention.

Schematically depicted in FIG. 1 is a plurality of transceiver stations 105-1 to 105-12, to be deployed or already deployed across the geographic area 100; each transceiver station 105-1 to 105-12 is shown in conjunction with an associated cell, being the portion of the geographic area 100 which is served by the considered transceiver station, i.e. the portion of the geographic area 100 where the signal received by that transceiver station is the strongest among the signals possibly received by other transceiver stations; the generic transceiver station 105-1 to 105-12 is said to be the "best server" in the respective cell. In the drawing, merely for the sake of clarity, the cells are depicted as being all hexagonal and of the same size, however in a practical case the cells will in general be different in shape and/or size, depending on several factors like the power of the respective transceiver stations, and the morphology of the area 100, which affects the propagation of the electromagnetic field.

Also schematically depicted in FIG. 1 are mobility paths 110-1 to 110-5 which are present in the geographic area 100 and which can be followed by users of mobile terminals, when the latter move across the geographic area 100. The mobility paths 110-1 to 110-5 may represent streets of a town or of a village, country roads, highways, railways and the like.

The planning of a cellular network to be deployed in a geographic area of interest, or the tuning of an already deployed cellular network in order to better fit the needs of service provisioning in the covered area is usually performed with the help of dedicated software tools, running on data processing apparatus.

Figure 2:
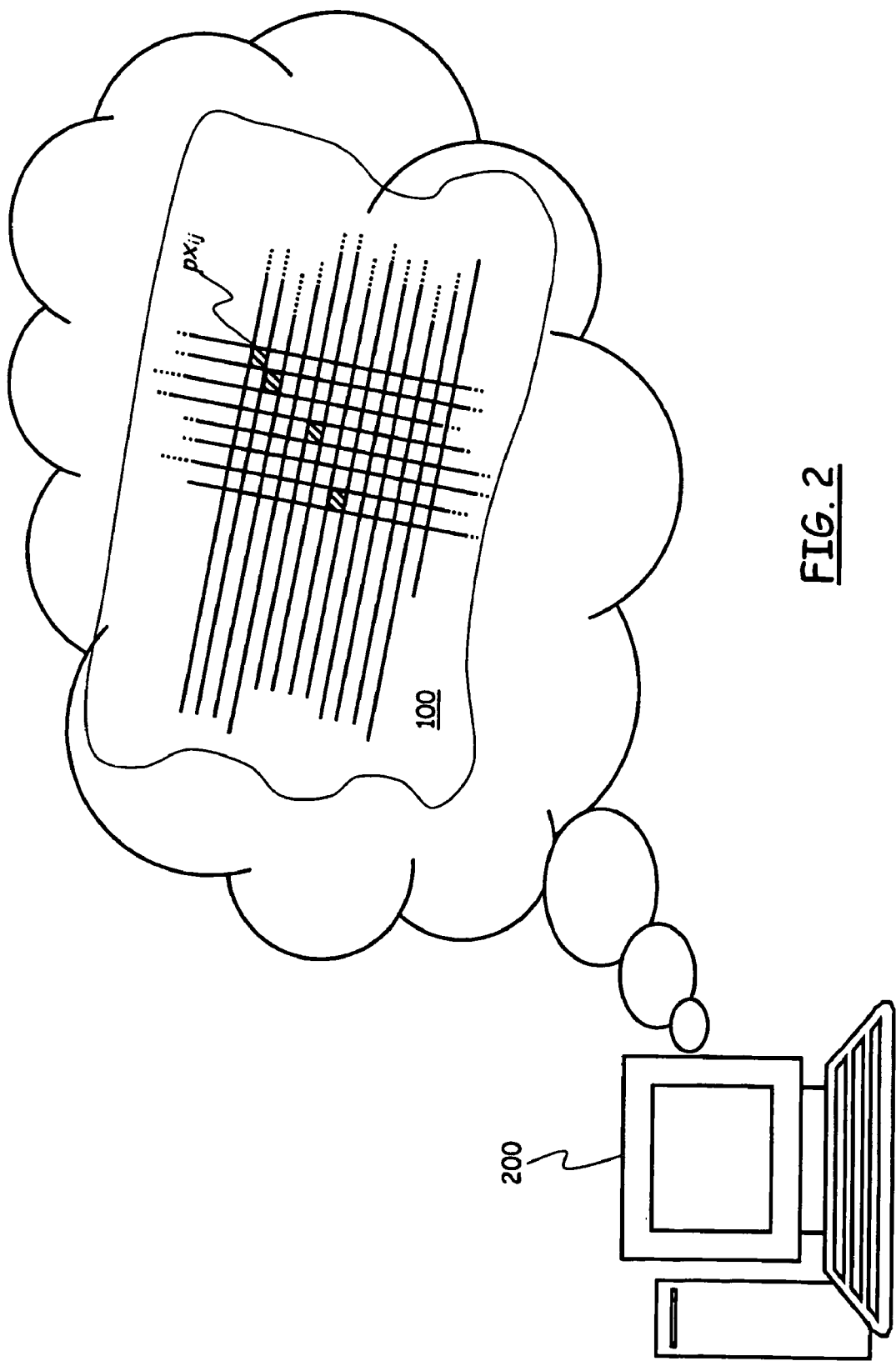
FIG. 2 schematically shows a subdivision into elementary area elements, or pixels, of the portion of geographic area of FIG. 1 used in a network planning phase, according to an embodiment of the present invention.

Referring to FIG. 2, there is schematically depicted a data processing apparatus 200, which, in one embodiment of the present invention, is adapted to be programmed for executing a software tool used for planning the cellular network (for example in respect of the portion of geographic area 100 shown in FIG. 1). The data processing apparatus 200 may be a general-purpose computer, like a Personal Computer (PC), a workstation, a minicomputer, a mainframe, and it may as well include two or more PCs or workstations networked together.

Figure 3:
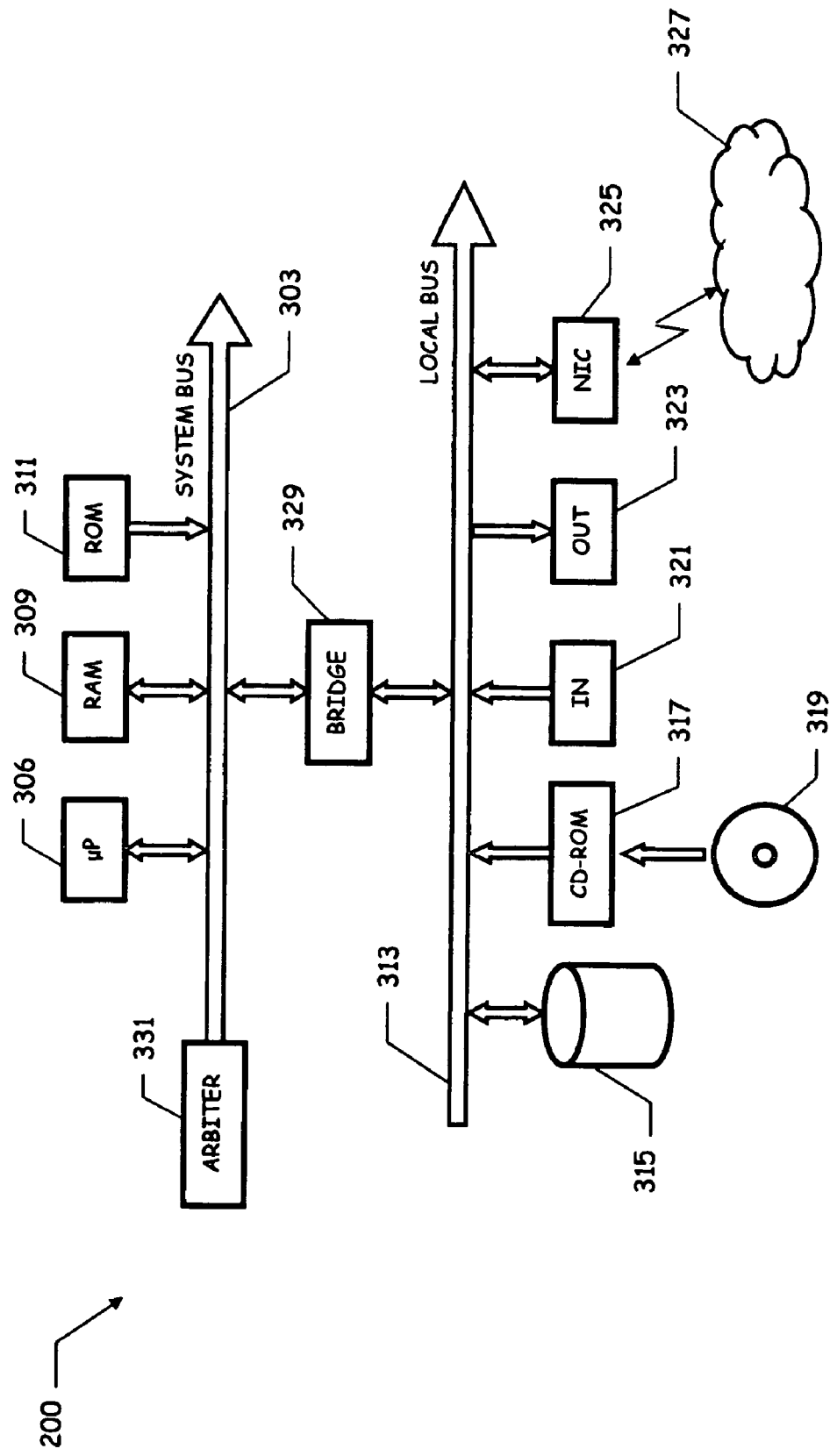
FIG. 3 schematically shows the main functional components of a data processing apparatus that, suitably programmed, is adapted to carry out an NBR set planning method according to an embodiment of the invention.

The general structure of the data processing apparatus 200 is schematically depicted in FIG. 3. The data processing apparatus 200 comprises several units that are connected in parallel to a system bus 303. In detail, one (possibly more) data processor (Op) 306 controls the operation of the computer 200; a RAM 309 is directly used as a working memory by the microprocessor 306, and a ROM 311 stores the basic code for a bootstrap of the computer 300. Peripheral units are connected (by means of respective interfaces) to a local bus 313. Particularly, mass storage devices comprise a hard disk 315 and a CD-ROM/DVD-ROM drive 317 for reading CD-ROMs/DVD-ROMs 319. Moreover, the computer 200 typically includes input devices 321, for example a keyboard and a mouse, and output devices 323, such as a display device (monitor) and a printer. A Network Interface Card (NIC) 325 is used to connect the computer 200 to a network 327, e.g. a LAN. A bridge unit 329 interfaces the system bus 303 with the local bus 313. Each microprocessor 306 and the bridge unit 329 can operate as master agents requesting an access to the system bus 303 for transmitting information; an arbiter 331 manages the granting of the access to the system bus 303.

With reference again to FIG. 2, the planning of a cellular network calls for ideally subdividing the geographic area of interest into relatively small, elementary area elements or pixels $px_{ij}$ (where i and j are two indexes which take integer values to span the area of interest), each pixel being an elementary, unit (in the shown example, square) area of pre-defined width, e.g. a 50 m by 50 m square.

In the cellular network planning, the propagation of the electromagnetic signals irradiated by the transceiver stations 105-1 to 105-12 of the network is simulated, and, based on the level of the signals that, as a result of the simulation, reaches every pixel, the pixels are assigned, in terms of coverage, to respective cells, which are defined the best servers in the pixels assigned thereto.

A phase of the cellular network planning calls for defining, for each cell of the area of interest 100, a list of adjacent cells (the so-called NBR set) which may be involved in a hand-over procedure when the users move. When the generic mobile terminal connects to a cell of the network, the NBR set of that cell is communicated to that terminal, and the terminal uses the NBR set to determine which signals, received from other cells, to monitor. Thus, when the user is engaged in a call and, due to the movements of the user, the level of the signal received from the transceiver station of the cell the mobile terminal is currently connected worsens too much, the cell to which hand over the call is readily determined.

According to an embodiment of the present invention, in the definition of the NBR sets, in addition to using information about the network topology information, information about the mobility paths of the users within the area under planning are exploited.

In particular, in one embodiment of the present invention, a convenient way to describe the mobility paths of the users within a certain geographic area is using one or more vectorial cartographic layers, each one representing a respective typology of mobility paths; for example, one vector cartographic layer may represent the plan of the streets of a town, another vector cartographic layer may represent the state routes, still another vectorial cartographic layer may represent the highways, still another vector cartographic layer may represent the railways.

Considering the generic vectorial cartographic layer, a mobility path, like for example a street of a town, may be described by means of a list of "vector items", wherein each vector item of the list is a couple of points—each point being identified by respective geographic coordinates—which identify a corresponding segment of the mobility path. For example, referring to FIG. 4, the mobility path 110-1 of FIG. 1 is depicted alone, in slightly enlarged scale, and consecutive eight points P1, P2, P3, P4, P5, P6, P7, P8 are distributed along the path 110-1, each point P1, P2, P3, P4, P5, P6, P7, P8 being described by the respective geographic coordinates (e.g., latitude and longitude). The eight points P1, P2, P3, P4, P5, P6, P7, P8 define seven vector items (P1,P2), (P2,P3), (P3,P4), (P4,P5), (P5,P6), (P6,P7) and (P7,P8), which, altogether, provide a piecewise-linear representation of the mobility path 110-1. The spatial distance between two points of a vector item gives the resolution of the vectorial layer; as can be seen in FIG. 4, the resolution is lower in correspondence of straight or almost straight segments of the mobility path, whereas the resolution generally increases in correspondence of curves.

Figure 5:
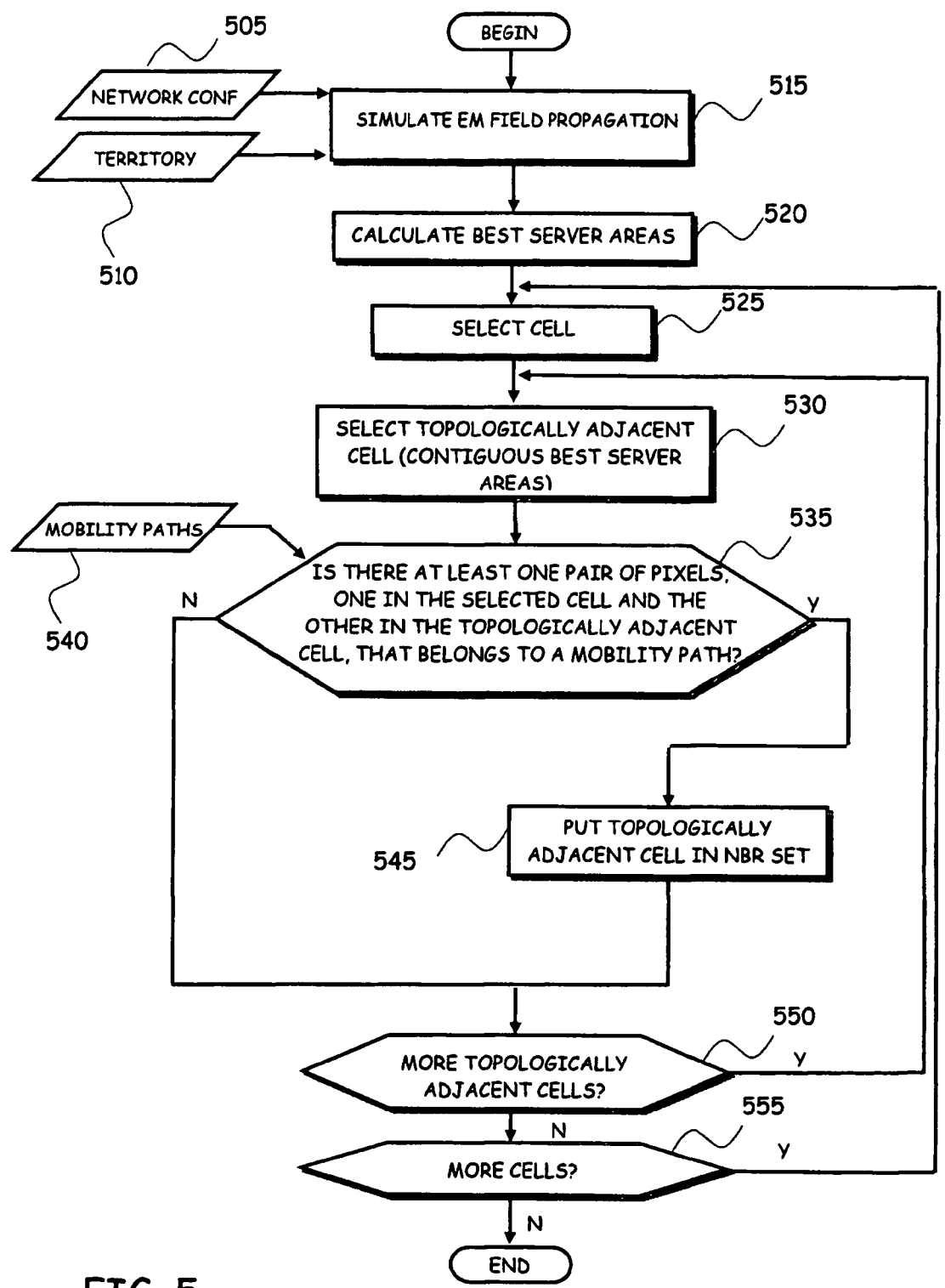
FIG. 5 is a schematic flowchart of a method according to an embodiment of the present invention for defining neighboring cells list.

Hereinafter, a method of defining NBR sets according to an embodiment of the present invention is described, making reference to the schematic flowchart of FIG. 5.

Firstly, based on a description 505 of a current cellular network configuration and a description 510 of the territory of the geographic area of interest, using an electromagnetic field propagation simulator, the distribution of the electromagnetic field, originated by the cellular network transceiver stations, through the area of interest is estimated (block 515). In particular, as mentioned in the foregoing, the geographic area of interest is subdivided into elementary area elements or pixels, and the electromagnetic field in every pixel is estimated.

Based on the estimated field, best server areas are calculated (block 520); this involves establishing, for every pixel, which is the strongest signal received at that pixel, and consequently assigning the pixel to the best server area of the transceiver station that irradiates that strongest signal. In particular, considering the case of a GSM network, the signal level considered to establish which is the best server is that of the Broadcast Control CHannel (BCCH), which is one of the channels defined by the GSM standard; in the case of a UMTS network, the signal level considered may be that of the Common Pilot CHannel (CPICH). As a result, the geographic area of interest is covered by several patches (like the exemplary, hexagonal patches depicted in FIG. 1) each patch being a cell of the network.

Then, for every network cell, i.e., for every transceiver station (blocks 525 and 555), the topologically adjacent cells are selected, one at a time (blocks 530 and 550). By "topologically adjacent" it is meant that the considered two cells, i.e. the best server areas of the respective transceiver stations, "touches" for at least one pixel. For each pair of topologically adjacent cells, it is assessed whether at least one pair of pixels can be identified, one in the cell under consideration, the other in the selected topologically adjacent cell, that belongs to one of the mobility paths (in particular to at least an item of a mobility part) within the geographic area of interest (block 535), described in one or more cartographic vectorial layers 540 (for example, including a vectorial layer of the streets of a town, and a vectorial layer of the railways). In the affirmative case (exit branch Y of block 535), a cell that is topologically adjacent to the cell currently considered is included in the NBR set of the latter (block 545), otherwise it is not included.

Figure 6:
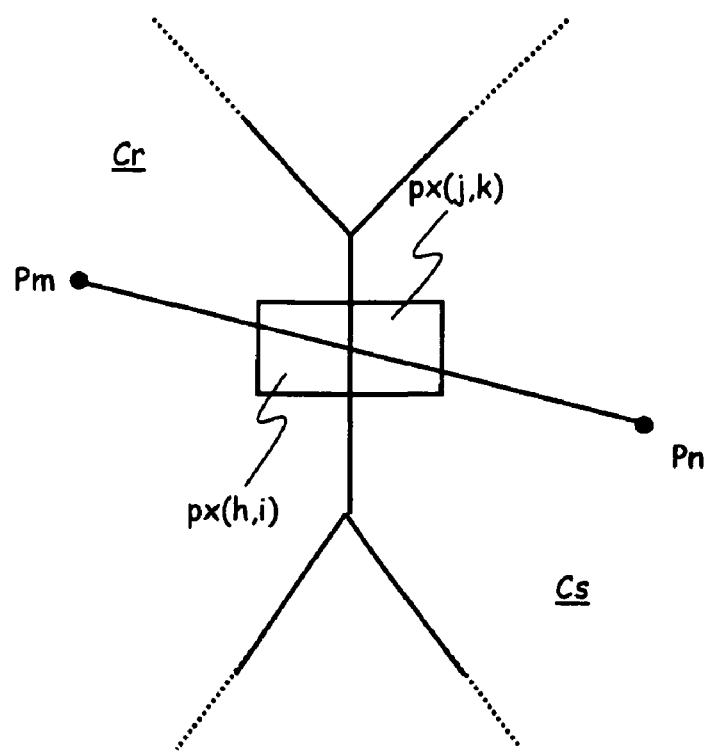
FIG. 6 pictorially shows a criterion for including a cell in the neighboring cells list of another cell.

In particular, referring to FIG. 6, considering a generic cell Cr, and a cell Cs which is topologically adjacent to the cell Cr, the cell Cs is included in the NBR set of the cell Cr only if a pair of pixels exists, like the shown pixels px(h,i) and px(j,k), which: a) belong one to the cell Cr and the other to the cell Cs, b) touch each other (i.e., are located along the boundaries of the respective cells) and c) belong to a vector item (Pm,Pn) of one of the cartographic vector layers 540 describing the user mobility paths in the geographic area of interest.

Thanks to the method of the present invention, it is possible to exclude from the NBR sets being defined those cells that, in the practice, will never be involved in hand-over procedures, because there are no mobility paths that the users can follow to go from one cell to the other. For example, referring back to FIG. 1, and considering the cell of the transceiver station 105-1, it can be appreciated that hand-over procedures may in the practice involve the cells 105-2, 105-3, 105-5 and 105-7, but not the cells 105-4 and 105-6, since there are no mobility paths that the users can follow to directly move from cell 105-1 to either of the cells 105-4 and 105-6.

Figure 7:
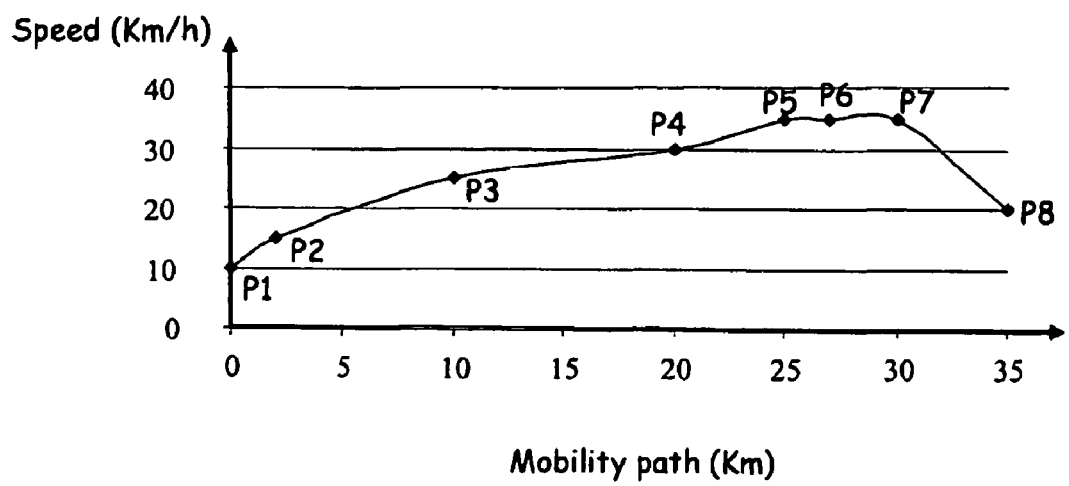
FIG. 7 is an exemplary diagram of a typical speed along a generic mobility path, used in an embodiment of the present invention.

In a preferred embodiment of the present invention, in addition to a description of the mobility paths, information about how the users typically move along the mobility paths in the area under planning is exploited to define the NBR sets. In particular, user mobility models are exploited, that are adapted to describe the direction and speed of movement of the users along the different mobility paths. For example, in FIG. 7 an exemplary speed profile is shown, describing the (typical) speed of users when moving along the mobility path 110-1 of FIG. 1. The diagram shows instant speed values varying continuously along the path 110-1, however, in an embodiment of the present invention, an average speed value may be calculated and assigned to each vector item (P1,P2), (P2,P3), (P3,P4), (P4,P5), (P5,P6), (P6,P7) and (P7,P8). In a simplified approach, an overall average speed value may be calculated for the whole mobility path 110-1, so that every vector item (P1,P2), (P2,P3), (P3,P4), (P4,P5), (P5,P6), (P6, P7) and (P7,P8) of the path is assigned a same average speed.

Exploiting the additional information about the typical speed of users along the mobility paths, it is possible to evaluate whether there may be criticalities in completing hand-over procedures, due to the too high typical speed of the users, and/or to the size of the best server areas. In particular, according to an embodiment of the present invention, for each cell adjacency relationship determined in the way described above, it is possible to calculate, based on the information about the typical user speed along the mobility paths, a time of permanence of a generic user in the cell being the destination of a potential hand-over if such a permanence time is shorter than a predetermined minimum time, the hand-over cannot be successfully completed, and thus it will likely fail.

The method of the present invention is applicable not only to the definition of NBR sets for intra-system hand-over procedures, between cells of a same system (e.g., GSM or UMTS), but also for the definition of cells adjacency relationships between cells of different hierarchical layers of a same system (e.g., the 900 MHz and the 1800 MHz GSM layers), as well as for defining cells adjacency relationships between cells of different systems, e.g. GSM and UMTS cells, for inter-system hand-over procedures.

Figure 8:
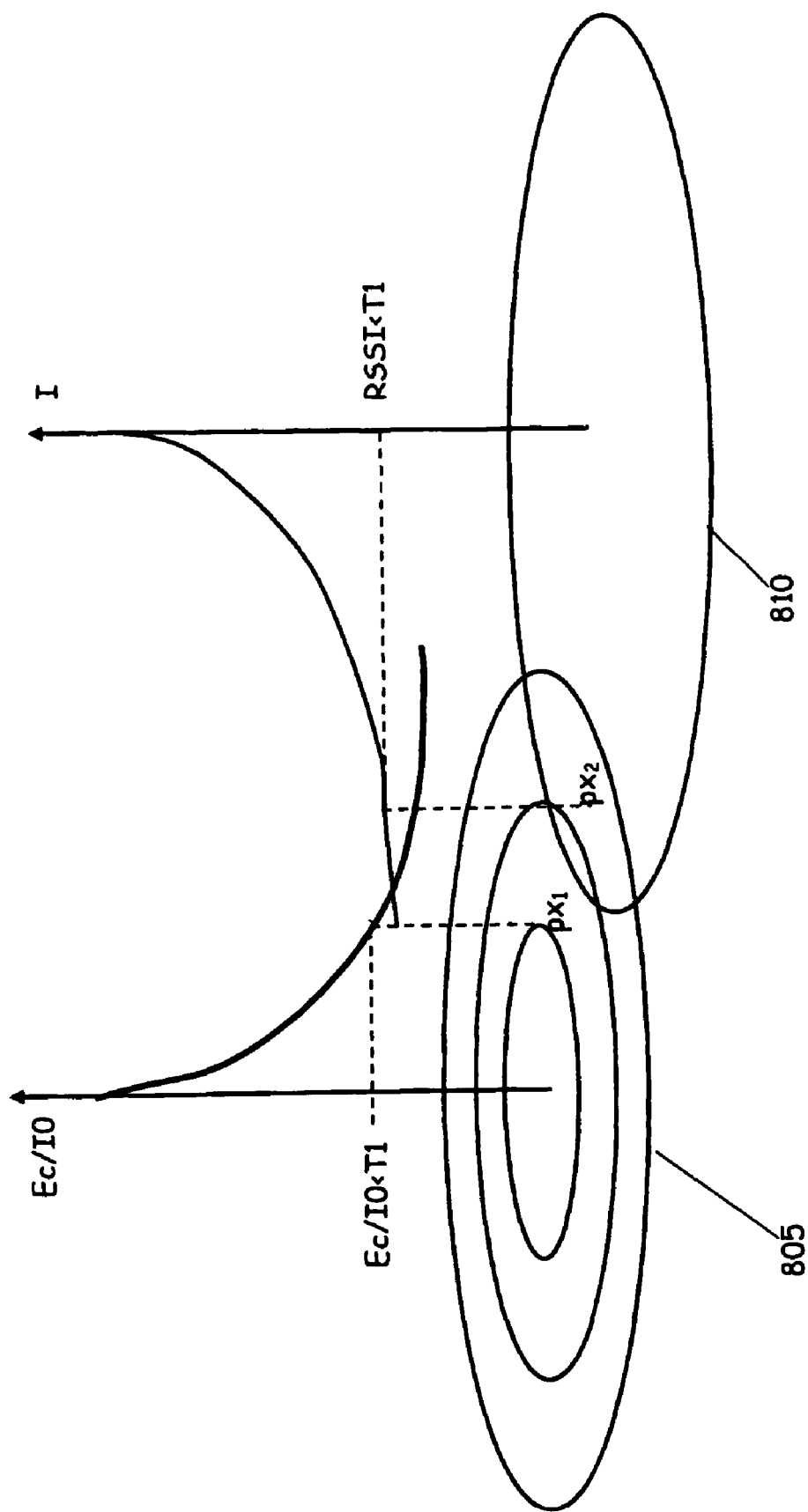
FIG. 8 pictorially shows the case of an inter-system handover between a UMTS and a GSM cell.

The latter case is schematized in FIG. 8: reference numeral 805 denotes a UMTS cell, and reference numeral 810 denotes a neighboring GSM cell; it is also assumed that mobile terminals moving through said cells are dual-mode.

According to an embodiment of the present invention, in order to declare that the cell 810 is adjacent, for inter-system hand-over purposes, to the cell 805, three conditions are to be met.

A first condition is that in at least one of the cartographic vectorial layers describing the user mobility paths in the geographic area of interest, there is at least one vector item that includes a $px_1$ pixel belonging to the UMTS cell 805, and a pixel $px_2$ belonging to the GSM cell 810, and the two pixels "touch" each other, i.e. they have at least one common side.

A second condition is that a level of the signal-to-noise ratio Ec/Io in the UMTS cell 805 at the pixel $px_1$ is lower than a predetermined threshold, defining the level of signal-to-noise ratio at which a dual mode, UMTS/GSM mobile terminal on the field will start measuring the signal level of the GSM network (a so-called "compressed mode" is activated in the mobile terminal, and the RSSI (Radio Signal Strength Indicator) of the GSM network starts being measured).

A third condition is that the GSM signal level (the measured RSSI), at the pixel $px_2$ should be at least equal to, or higher than a predetermined threshold, defining the signal level at which the inter-system hand-over from the UMTS to the GSM system can start.

In addition, assuming that not only the description of the user mobility paths, but also a description of the typical speed of the users along the mobility paths is provided, for every pair of UMTS and GSM cells that are defined adjacent in the way described above, an indication about the timing of the hand-over procedure may be provided. In particular, said indication may include, for every pixel satisfying the third condition listed above, an indication of the time that the typical user will spend in the destination GSM cell 810 is provided. This allows detecting possible criticalities, due for example to the fact that, due to the speed of the user, the time lapsed between the activation of the compressed mode and the instant at which the inter-system hand-over from the UMTS to the GSM system starts may be insufficient for completing the hand-over from the UMTS cell 805 to the GSM cell 810.

The present invention provides a method by which it is possible to define adjacency relationships between the cells of a (homogeneous or heterogeneous) cellular network which are more true-to-reality for the purposes of managing hand-over procedures, because they take into account the real possibility of motion of the users, thereby avoiding to include, in the list of adjacent cells, cells which will never be involved in a hand-over, being impossible for the users to follow those directions of movement.

The method of the invention can also be used to evaluate an already existing set of adjacency relationships (irrespective of how they have been defined), so as to assess how good it is, from the viewpoint of the hand-over; in particular, the method allows estimating how many hand-over procedures could possibly fail for missing coverage, and how many hand-over procedures could instead fail for inadequate timing (due to the average users speed).

The present invention has been here disclosed making reference to some exemplary embodiments thereof; those skilled in the art will however recognize that several changes to the described embodiments, as well as other embodiments are possible, without departing from the protection scope defined in the appended claims.

The invention claimed is:

1. A computer-implemented method for defining lists of neighboring cells of a cellular radiocommunications network, comprising:
    obtaining, by a processor, a description of mobility paths for users of mobile communications terminals in a geographic area of interest;
    including, by the processor, a first cell in the list of neighboring cells of a second cell in case, based on said mobility paths' description, to ascertain that there is a mobility path joining the first and the second cells;
    dividing, by the processor, the geographic area of interest into a plurality of elementary area elements; and
    assigning, by the processor, each of the plurality of elementary area elements to a respective network cell,
    wherein obtaining the description of mobility paths for users of mobile communications terminals in the geographic area of interest comprises obtaining at least one vectorial description of said mobility paths,
    wherein said at least one vectorial description comprises, for each mobility path, at least one vector item formed of a pair of geographic points belonging to each mobility path, and
    wherein including the first cell in the list of neighboring cells of the second cell in case, based on said mobility paths' description, to ascertain that there is a mobility path joining the first and the second cells, comprises including the first cell in the list of neighboring cells of the second cell if at least one elementary area element of the first cell and at least one elementary area element of the second cell belong to said at least one vector item.

2. The method of claim 1, wherein the first cell is in the list of neighboring cells of the second cell if said at least one elementary area element of the first cell is adjacent to said at least one elementary area element of the second cell.

3. The method of claim 1, further comprising:
    for each of said user mobility paths, providing a statistical description of users' motion speeds along said each of said user mobility paths; and
    based on said description of users' motion speeds, assessing potential hand-over criticalities.

4. The method of claim 3, wherein, for a user of a mobile communications terminal moving along said mobility path from said second cell to said first cell, assessing potential hand-over criticalities comprising checking if a permanence time of said user in said first cell is lower than a predetermined minimum time.

5. A non-transitory computer-readable storage medium encoded with a computer program comprising instructions capable of being adapted to implement the method according to claim 1, when executed by a computer processor.

6. A data processing system capable of being adapted to implement a method for defining lists of neighboring cells of a cellular radiocomunications network, comprising:
    a processor for obtaining a description of mobility paths for users of mobile communications terminals in a geographic area of interest; and
    including a first cell in the list of neighboring cells of a second cell in case, based on said mobility paths' description, to ascertain that there is a mobility path joining the first and second cells, when programmed to execute the computer program of claim 5.

7. A computer-implemented method for making handover in a cellular radiocommunications network, comprising:
    obtaining, by a processor, a description of mobility paths for users of mobile communications terminals in a geographic area of interest;
    including, by the processor, a first cell in a list of neighboring cells of a second cell in case, based on said mobility paths' description, to ascertain that there is a mobility path joining the first and the second cells;
    making, by the processor, handover when a user of a mobile communications terminal passes from said second cell to said first cell using said list of neighboring cells;
    dividing, by the processor, the geographic area of interest into a plurality of elementary area elements; and
    assigning, by the processor, each of the plurality of elementary area elements to a respective network cell,
    wherein obtaining the description of mobility paths for users of mobile communications terminals in the geographic area of interest comprises obtaining at least one vectorial description of said mobility paths,
    wherein said at least one vectorial description comprises, for each mobility path, at least one vector item formed of a pair of geographic points belonging to each mobility path, and
    wherein including the first cell in the list of neighboring cells of the second cell in case, based on said mobility paths' description, to ascertain that there is a mobility path joining the first and the second cells, comprises including the first cell in the list of neighboring cells of the second cell if at least one elementary area element of the first cell and at least one elementary area element of the second cell belong to one of said at least one vector item.

* * * * *